June 19, 1934. E. E. QUINTON 1,963,503
METHOD AND APPARATUS FOR MIXING AND WORKING OF RUBBER
Filed April 6, 1933 6 Sheets-Sheet 1

INVENTOR
Ernest Eric Quinton
BY
ATTORNEYS

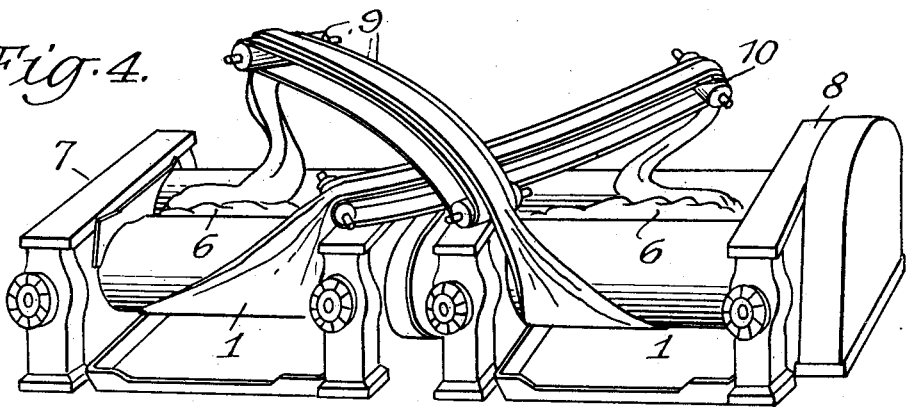
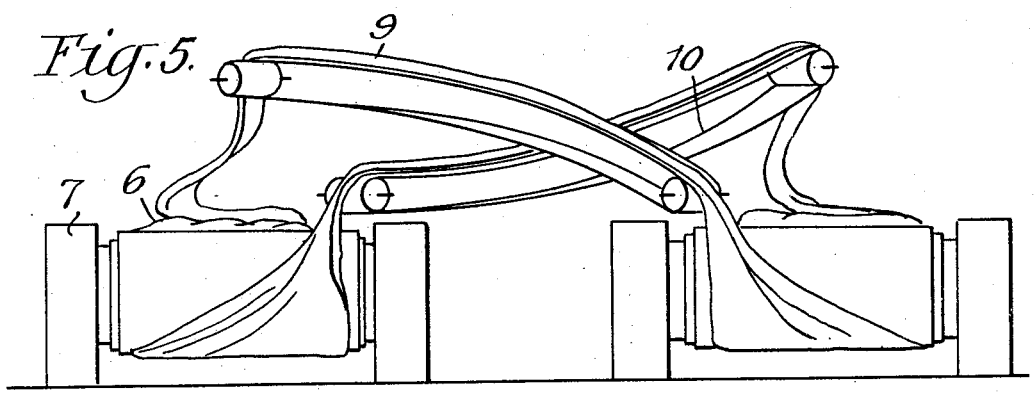
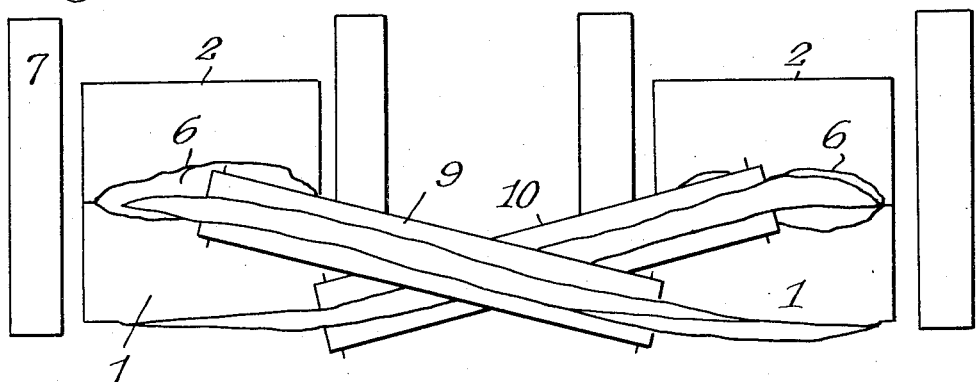

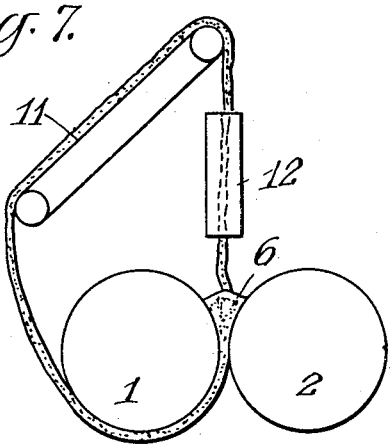
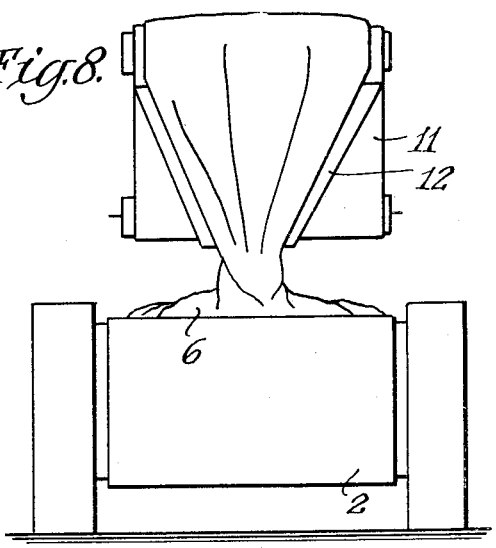
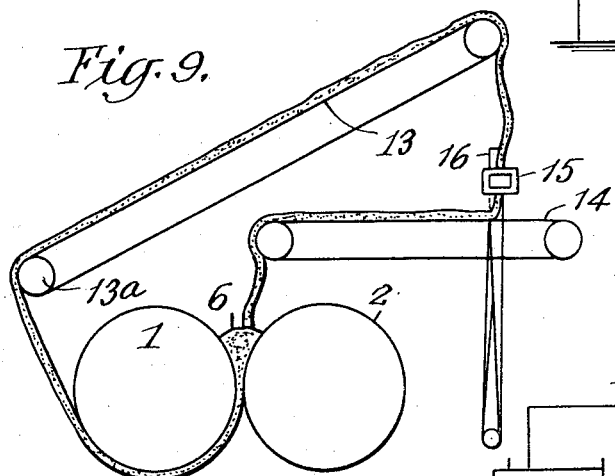
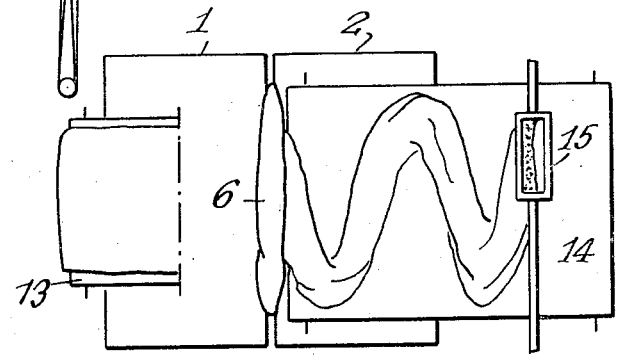
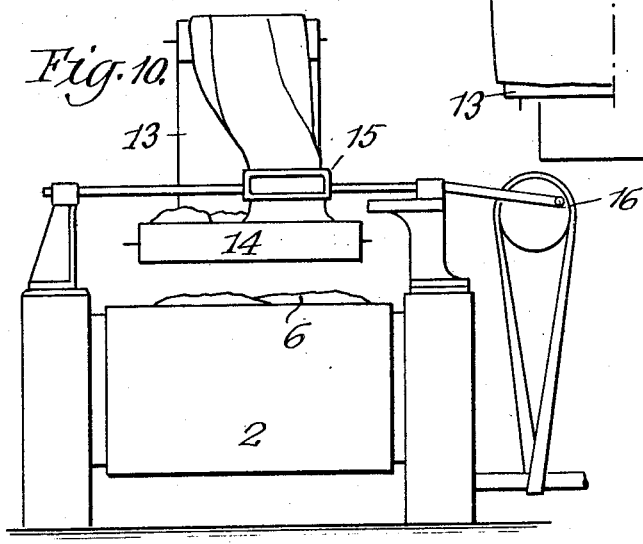
INVENTOR
Ernest Eric Quinton
BY
ATTORNEYS June 19, 1934.　　　　E. E. QUINTON　　　　1,963,503
METHOD AND APPARATUS FOR MIXING AND WORKING OF RUBBER
Filed April 6, 1933　　6 Sheets-Sheet 4
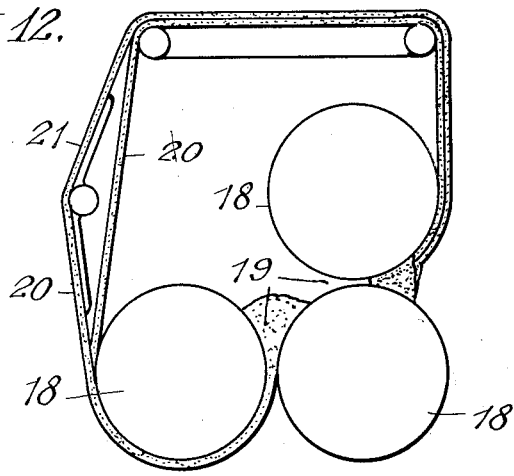
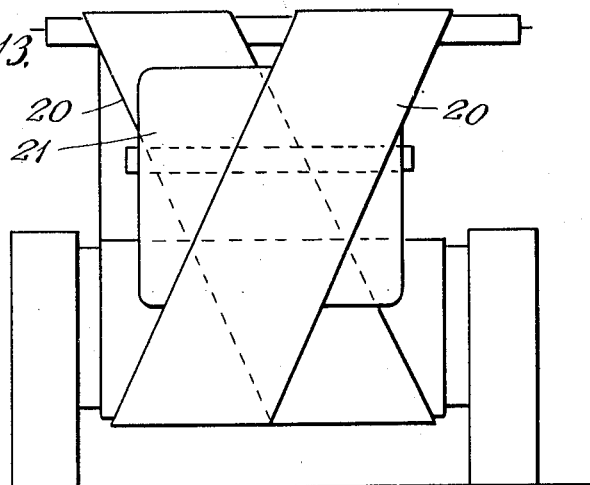
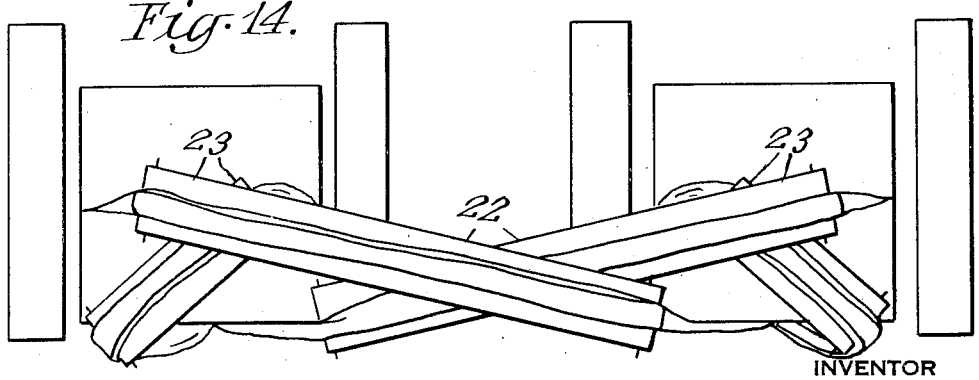
INVENTOR
Ernest Eric Quinton
BY
ATTORNEYS June 19, 1934.   E. E. QUINTON   1,963,503
METHOD AND APPARATUS FOR MIXING AND WORKING OF RUBBER
Filed April 6, 1933   6 Sheets-Sheet 5

INVENTOR
Ernest Eric Quinton
BY
ATTORNEYS

June 19, 1934.  E. E. QUINTON  1,963,503
METHOD AND APPARATUS FOR MIXING AND WORKING OF RUBBER
Filed April 6, 1933    6 Sheets-Sheet 6

INVENTOR
Ernest Eric Quinton
BY
ATTORNEYS

Patented June 19, 1934

1,963,503

UNITED STATES PATENT OFFICE 1,963,503

METHOD AND APPARATUS FOR MIXING AND WORKING OF RUBBER

Ernest Eric Quinton, Heath, near Sutton Coldfield, England, assignor to Dunlop Tire & Rubber Corporation, Buffalo, N. Y., a corporation of New York Application April 6, 1933, Serial No. 664,693
In Great Britain March 15, 1932

9 Claims. (Cl. 18—2)

This invention relates to the automatic mill mixing, warming, masticating, sheeting, or the like working of rubber and the like, hereinafter called rubber, and apparatus therefor.

Its object is to provide a new or improved arrangement which, although simple in conception and design and also inexpensive in first cost, operation and maintenance, is highly efficient in use, ensuring as it does that the batch of rubber is thoroughly mixed or otherwise worked throughout.

In my invention I pass the rubber in a continuous manner through milling rolls in successive millings and between said millings withdraw rubber from said rolls in a continuous manner and return it thereto. While withdrawn, the rubber may be manipulated by folding, doubling, narrowing and thickening or zig zagging to render a successive milling more effective. The rubber may be separated upon, or after, milling and the separated strips or streams may be transposed or otherwise altered in relative position and laterally or otherwise relatively to the rolls before returning thereto so that various parts of the rubber mass may be intermingled.

I may use only one mill, the rubber progressing continuously away from the same and back thereto, or alternatively, I may use a plurality of mills between which the rubber is continuously progressed.

The manipulation referred to may include inter alia, feeding the rubber away from and/or back to the rolls along a plurality of paths, reducing the rubber to a smaller compass than it has on leaving the rolls, or twisting, zig-zagging or analogously diverting the rubber from its normal line of progression, or a convenient combination of these things.

Various other features and provisions of the invention will become apparent as the description proceeds.

As far as terminology is concerned, I use the term "continuous" to indicate a general effect of continuity, but I do not mean to imply that the effects thereby described may not be stopped, interrupted at intervals or modified as to speed. I use the term "rubber" to mean any mixture of or containing rubber or the like, said term being used commonly for all the material being mixed or only part thereof. By the term "mixing" I mean any blending, mixing, masticating or the like treatment to which rubber is submitted between milling rolls.

In order that the invention may be readily understood and carried into effect, the same will now be described with reference to the accompanying drawings which are all more or less diagrammatic, and in which—

Fig. 4 is a perspective view of one embodiment of the invention applied to two mills.

Figs. 5 and 6 are, respectively, side and plan views of Fig. 4.

Figs. 7 and 8 are, respectively, end and side views of one alternative embodiment of the invention.

Figs. 9, 10 and 11 are, respectively, end, side and plan views of another alternative.

Figs. 12 and 13 are, respectively, end and side views of an alternative using a specially designed mill.

Fig. 14 is a plan view of an alternative using two mills.

Figure 1:
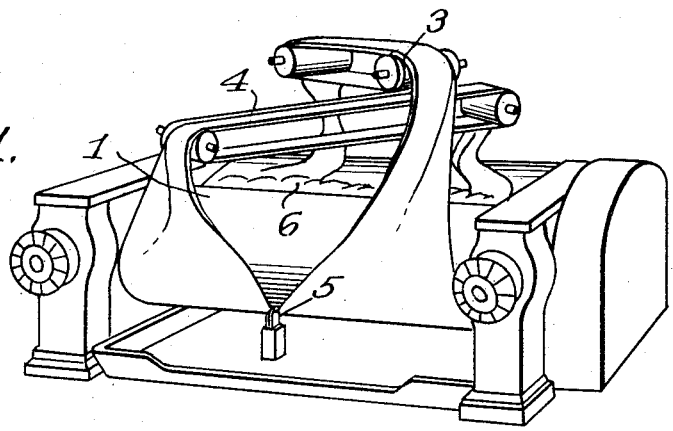
Fig. 1 is a perspective view of one embodiment of the invention applied to a single mill.
Figure 2:
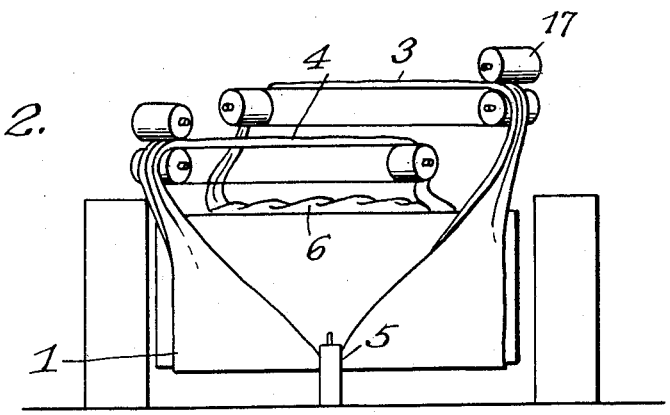
Figs. 2 and 3 are, respectively, side and plan views of Fig. 1.
Figure 3:
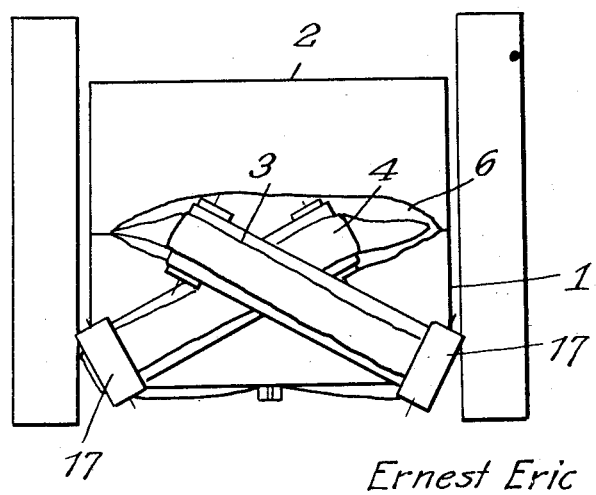

Figs. 1, 2 and 3 show the preferred arrangement using a single mill. In this case, over the mill rolls 1 and 2 I place a pair of driven conveyors 3 and 4 which cross over as shown. The rubber is sheeted onto the front roll 1 and is divided by means of a cutter 5 into lesser sheets which, as shown, then pass to the conveyors 3 and 4. Thus the rubber from the right hand side of the mill is continuously progressed to the left hand side and vice versa, a bank of rubber 6 being maintained in the nip of the rolls.

Figs. 4, 5 and 6 show the preferred arrangement using a plurality of mills. In this case I use a pair of mills 7 and 8 and arranged between the two, a pair of conveyors 9 and 10 which, as shown, continuously progress the rubber to and fro between the two mills. Said rubber is sheeted onto the front rolls 1 and the whole sheet is, as shown in the drawings, creased and folded into a lesser compass as it passes to said conveyors. As before, a bank 6 is maintained at the nip of the rolls.

These are the two main systems which commend themselves to me, particularly as it will be seen that in both the position of the sheet, or part thereof, is altered in relation to the length of the mill rolls and/or in relation to other parts of the sheet. In other words, the position of certain points on the sheet is changed in relation to other points thereon, the whole mass of rubber being thoroughly intermixed and worked together. And further, the bank of rubber accumulating in the nip of the rolls is kept working and constantly supplying different material to the sheet passing through said rolls.

I will now describe certain modifications of or additions to these two main embodiments.

Part of the rubber may, if desired, feed back to the same or substantially the same part of the mill from which it came.

For example, in Figs. 1, 2 and 3, instead of a single cut at the center of the rolls I may use two cuts, one each side, and either let the middle strip remain on the rolls or feed it away and back again.

The creasing or folding effect provided by the scheme shown in Figs. 4 to 6, and to a lesser extent in Figs. 1 to 3, is a form of stratifying but, alternatively, I may provide definite stratification by, for example, superimposing the strips referred to in the next preceding paragraph one upon the other.

Instead of definitely crossing the conveyors 3 and 4 one over the other, I may merely cause them to converge toward the center of the mill, the rubber from one preferably meeting the rubber from another and falling into the nip as a stratified length.

Instead of dividing the rubber into strip or analogous form and guiding it along a plurality of paths as exemplified in Figs. 1 to 3, I may merely reduce it into a smaller compass, as shown for example in Figs. 7 and 8. In this case the sheet from the front roll 1 is fed away from the mill by a conveyor 11 and is then converged into the nip by a chute 12 or any other convenient means.

In its progression between successive millings the sheet may be twisted, zig-zagged or similarly diverted from its normal line of progression.

For example, as shown in Figs. 9, 10 and 11, the rubber may be fed as a sheet away from the mill on a conveyor 13 and back thereto on a conveyor 14 onto which last it is zig-zagged by means of a shoe 15 which engages it (the rubber preferably passing through the shoe) and reciprocates it, by means of crank mechanism 16, across said conveyor 14 so that said sheet is laid in zig-zags thereon as shown in Fig. 11.

The rubber may, prior to coming to the shoe 15, have been previously folded or creased into a lesser compass, or the shoe itself may produce that effect as the rubber passes through it. Instead of a shoe such as 15, I may use a chute such as that shown in Figs. 7 and 8 of the drawings and cause that to oscillate.

It is exemplified in Figs. 7 and 8 that instead of two or more conveyors, I may use only one and this is further exemplified in a convenient modification of the scheme shown in Figs. 9 to 11, according to which modification the conveyor 14 is dispensed with while the oscillating means operates at the front end 13a of the conveyor 13, the latter being shortened so as to deliver directly over the nip of the rolls.

The rubber may be oscillated in a variety of ways, for example, instead of oscillating it prior to falling back into the nip as in Figs. 9 to 11, it may be oscillated during its fall into the nip.

I may make special provision for this purpose such as an oscillating chute associated with the conveyor overhanging the nip, or alternatively, I may rely on the oscillation incidental to the fall of the rubber from a comparatively high position, as indicated for example in Figs. 1 to 6.

I may, of course, use ways other than those set out above for altering the path of the rubber, or for getting the rubber into a smaller compass. For example, in one scheme for effecting both these things, the lower conveyor 14 in Figs. 9 to 11 is driven slower than the upper conveyor 13 so as to effect a procession of folds.

Where the rubber is divided into strips the same are preferably produced with the aid of a suitable cutter or cutters such as 5, or the like, associated with the mill. These may be operated continuously and from stationary positions or, alternatively, intermittently and/or from different positions; for example, they may oscillate or move along the length of the rolls so that in effect strip is taken from different points along said rolls continuously.

Instead of conveyors, as shown, I may use rollers, but the conveyor system is preferred because the rubber is then given the optimum support in its progression between millings.

In certain instances the guiding and/or progressing means may merely "idle", functioning simply to guide the rubber, progression of the same being effected by the mill and/or by gravity, but in the main, said means are power driven, or a combination of idler and driven means may be used. If desired, the rubber may be caused to pass between an opposed pair of rollers, or equivalent, for example, to assist in its progression, to twist or crease it, or to cut it.

For example, I may provide nip rollers 17, see Figs. 2 and 3, on the front end of the conveyors 3 and 4 so as to assist the take-off of the rubber from the mill.

The guiding and/or progressing means may effect said manipulation, e. g., said crossing, creasing, twisting, folding, stratifying, oscillating and so on or, alternatively, said means may function mainly to carry, guide or feed the sheet, other manipulation such as folding or creasing being effected or initiated by hand, for example, the sheet may be folded by hand, i. e., its edges moving over towards its center line, as it passes onto the conveyor 11 or 13.

Means may be provided for checking, stopping or otherwise controlling the progression of the rubber for example, so as to suit the feed-in of the rubber nicely to the conditions obtaining or to assist generally in the mixing.

For example, automatically operating festoon or the like control may be used to control the feed, or again I may provide a manually controlled stop whereby certain of the power driven guiding and/or feeding means, for instance, the pair of opposed rollers aforesaid, may be put temporarily out of operation or slowed down as to speed.

In addition to leading the rubber away from the mill and back thereto, I may use a suitably arranged plough or ploughs, or equivalent means, associated with the mill rolls and adapted to assist in mixing up the batch generally.

For example, the rubber may be progressed along the mill rolls by a plough or ploughs, fed off at the end and re-fed to the other end; or again, one plough may direct the rubber in one direction and another plough in a different direction; or again, ploughs may be used simply to divert the rubber in only one direction, e. g., to the center of the mill.

Referring particularly to the plural milling scheme, it should be understood that the respective mills may be all of the same kind or not as desired, e. g., they may all be standard mills, or one or more of them may be specially designed mills; they may be spaced any convenient distance apart, or they may be associated closely together even to the extent of incorporating a plurality of mills into a unitary machine or apparatus.

For example, in Figs. 12 and 13 I may use a mill with three rolls 18, giving two nips 19 between which the rubber is passed, as shown in the drawings, as a pair of strips 20 which are separated by a guard 21.

As a combination of the scheme shown respectively in Figs. 1 and 4, I may use the arrangement shown in Fig. 14 in which I provide a cross over 22 from mill to mill and separate cross overs 23 on each mill.

Figure 15:
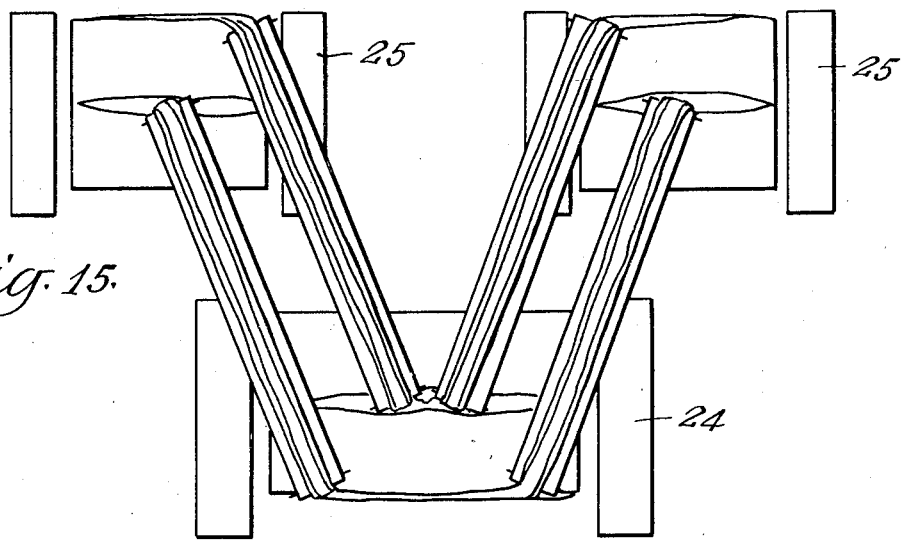
Figs. 15, 17 and 18 are plan views of modifications of the invention applied to more than two mills.

I may use more than two mills as a battery for carrying out my invention—for example, one mill may feed more than one mill and, per contra, more than one mill may feed one mill. For example, see Fig. 15, an 84" mill 24 may be fed by a pair of 40" mills 25, the reverse being the case in the return.

Figure 16:
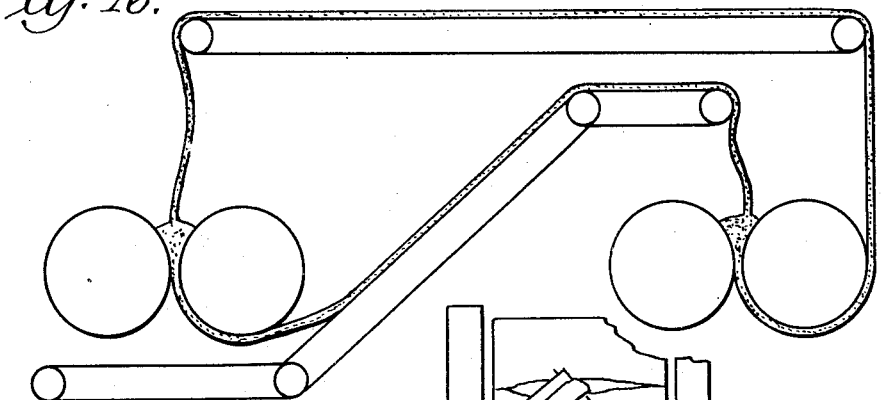
Fig. 16 is an end view of another alternative using two mills.

Instead of arranging the mills in line they may be arranged one behind the other, when the rubber may be progressed between them as shown in Fig. 16.

Figure 18:
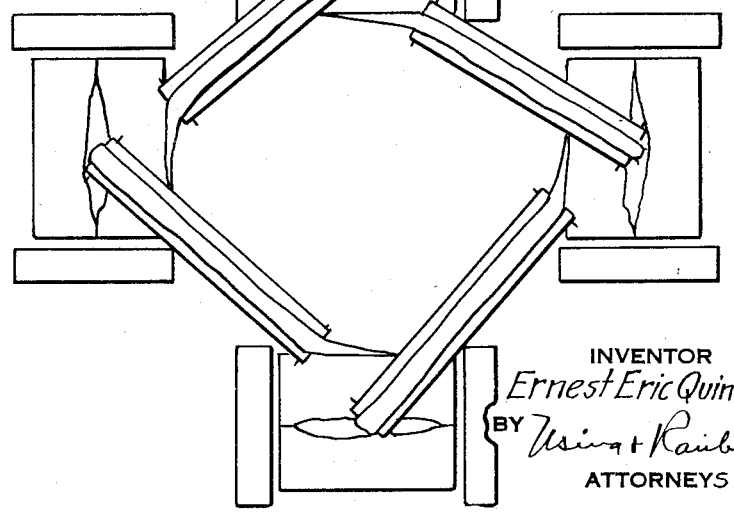
Figure 17:
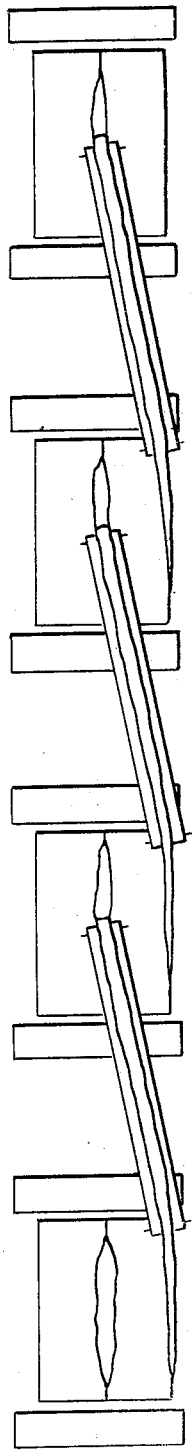

Instead of progressing the rubber to and fro between the mill, i. e., from one to another and back again, it may be progressed in other ways. For example, as shown in Fig. 17 it may be progressed from mill to mill, arranged in line formation, without any such return, or as shown in Fig. 18 it may be circulated around a battery of mills arranged in circular formation, the latter scheme being a combination of the line scheme shown in Fig. 17 and the two-mill scheme shown in Figs. 4 to 6.

Finally it should be understood that the main provisions of the invention may be utilized in conjunction with other provisions, such for example as tend further toward complete automaticity of operation or extension thereof.

For instance, I may provide automatic cutting off or final take-away or removal of the rubber from the mill; for example, the rubber, when it has been worked or mixed sufficiently, may be cut off the mill and run directly away therefrom, e. g., through a cooling and powdering bath and/or to another machine, the latter for example being an extruder, a calender, or again, another mixing, sheeting, masticating or the like working mill.

Figure 19:
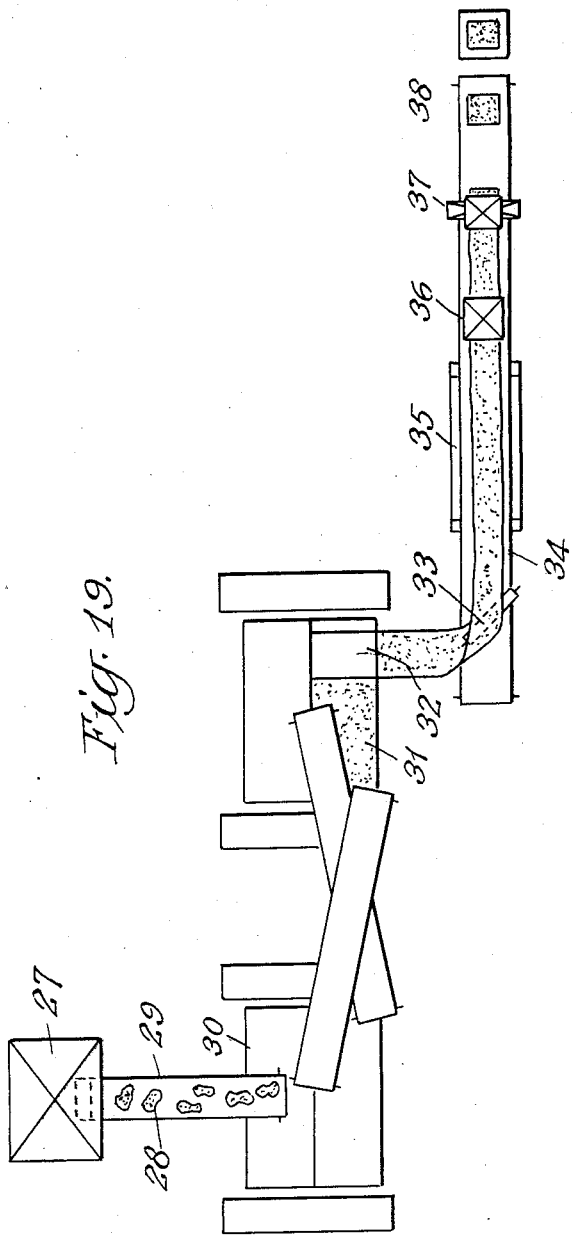
Fig. 19 is a plan view illustrating the invention associated with other provisions.

In one scheme, given simply as an example and which may be modified within wide limits, the rubber is partly mixed or preliminarily worked in an enclosed type mixer 27, Fig. 19, which, usually as lumps 28, is passed by means of a conveyor 29 to the mixing apparatus 30 according to this invention, whereby it is sheeted and properly mixed. When mixing is finished, the rubber is allowed to sheet onto the roll 31, is cut therefrom by a knife 32 and is guided as by an inclined roller 33 onto another conveyor 34, whereby it is passed, for example, through a cooling bath 35 and from thence via a powdering device 36 to a cutting device 37 whereby it is cut into small pieces 38 for ready manipulation in subsequent operations.

A further advantage of the invention in practice lies in this, that as the rubber is taken away from the mill along an extended path, increased cooling is automatically provided and this effect may, if desired, be augmented in any convenient way—thus the various operations may be generally speeded up, e. g., the mills may be run at a higher speed.

Having now particularly described and ascertained the nature of my said invention and in what manner the same is to be performed, I declare that what I claim is—

1. A method of mixing rubber which comprises rolling said rubber to sheet form, dividing the resulting sheet, transferring the divided sheet parts to relatively reversed positions and again rolling to sheet form.

2. A method of mixing rubber which comprises rolling and forming said rubber into spaced sheets, interchanging the spacial relation of said sheets, and rolling said sheets in said interchanged relation.

3. A method of mixing rubber which comprises feeding said rubber in spaced streams, rolling said streams of rubber to sheet form, and supplying rubber sheet rolled from one stream to the other stream.

4. Apparatus for mixing rubber which comprises means for rolling rubber to separate sheets, and conveyor means for returning said sheets in interchanged positions to said rolling means.

5. Apparatus for mixing rubber which comprises a pair of roll sets for rolling rubber to sheet form, conveyor means for conveying rubber sheet from part of the surface of one roll set to the other roll set and from one part of said second mentioned roll set to said first mentioned roll set.

6. Apparatus for mixing rubber which comprises a pair of roll sets for rolling rubber to sheet form, conveyor means for conveying rubber sheet from part of the surface of one roll set to the other roll set, and conveyor means for transferring rubber from the other part of each roll set to said roll set in axially displaced position.

7. Apparatus for mixing rubber which comprises a pair of roll sets to roll rubber to sheet form, a third roll set of larger capacity than those of said pair, means for conveying rolled sheet from said pair of roll sets to said third roll set, and means for dividing rolled sheet from said third roll set and returning the divided sheet to said pair of roll sets, one to each roll set of said pair.

8. The method of claim 2 in which rubber material to be mixed is continuously supplied for rolling, and rolled sheet is continuously withdrawn therefrom.

9. Apparatus for mixing rubber which comprises a number of roll sets for rolling rubber to sheet form, conveyor means for conveying rolled sheet from one roll set to another, means to return part of said sheet to its original roll set, means for continuously supplying rubber material to be rolled, and means for continuously removing the other part of said rolled sheet therefrom.

ERNEST ERIC QUINTON.